June 17, 1952   J. E. CINTRON   2,601,004
GEAR PUMP

Filed July 19, 1946   2 SHEETS—SHEET 1

INVENTOR.
JUAN ENRIQUE CINTRON.
BY Cecil J Owens
ATTORNEY.

June 17, 1952     J. E. CINTRON     2,601,004
GEAR PUMP

Filed July 19, 1946     2 SHEETS—SHEET 2

INVENTOR
JUAN ENRIQUE CINTRON
By Cecil J Arens

ATTORNEY

Patented June 17, 1952

2,601,004

UNITED STATES PATENT OFFICE 2,601,004

GEAR PUMP

Juan E. Cintrón, South Bend, Ind., assignor to Bendix Aviation Corporation, South Bend, Ind., a corporation of Delaware Application July 19, 1946, Serial No. 684,694

4 Claims. (Cl. 103—126)

This invention relates to improvements in gear pumps.

Since the advent of the gear pump there has always been the problem of trapping fluid between the meshing teeth of the gears. Fluid trapped between the teeth adversely affects the mechanical efficiency and pump life. Various ways have been proposed for releasing this trapped fluid but all seem to have some objectionable features such, for example, as the use of complicated valve mechanisms. Not a few of the attempts at relieving the entrapped fluid have resulted in a loss of volumetric efficiency without having accomplished the primary objective of adequately relieving high trapping pressures.

It is, therefore, an object of the invention to provide a gear pump which has its teeth formed in a manner to allow the escape of fluid confined between teeth in meshing relationship.

A further important object of the invention resides in the provision of a gear pump or motor, having gears the teeth of which have grooves or reliefs in their flanks extending laterally thereacross and radially from a predetermined point in the tooth flanks adjacent the base circle to a point in their flanks where the line of action intersects the tooth flanks when two mating tooth surfaces have their pitch lines substantially coextensive at the pitch point.

A yet further important object of the invention resides in the provision of a gear pump, the teeth of which have cut out portions in the exterior surfaces thereof to provide escape means for fluid confined between teeth in mesh.

The above and other objects and features of the invention will be apparent from the following description of the device taken in connection with the accompanying drawings which form a part of this specification and in which.

Figures 1, 3, 4:
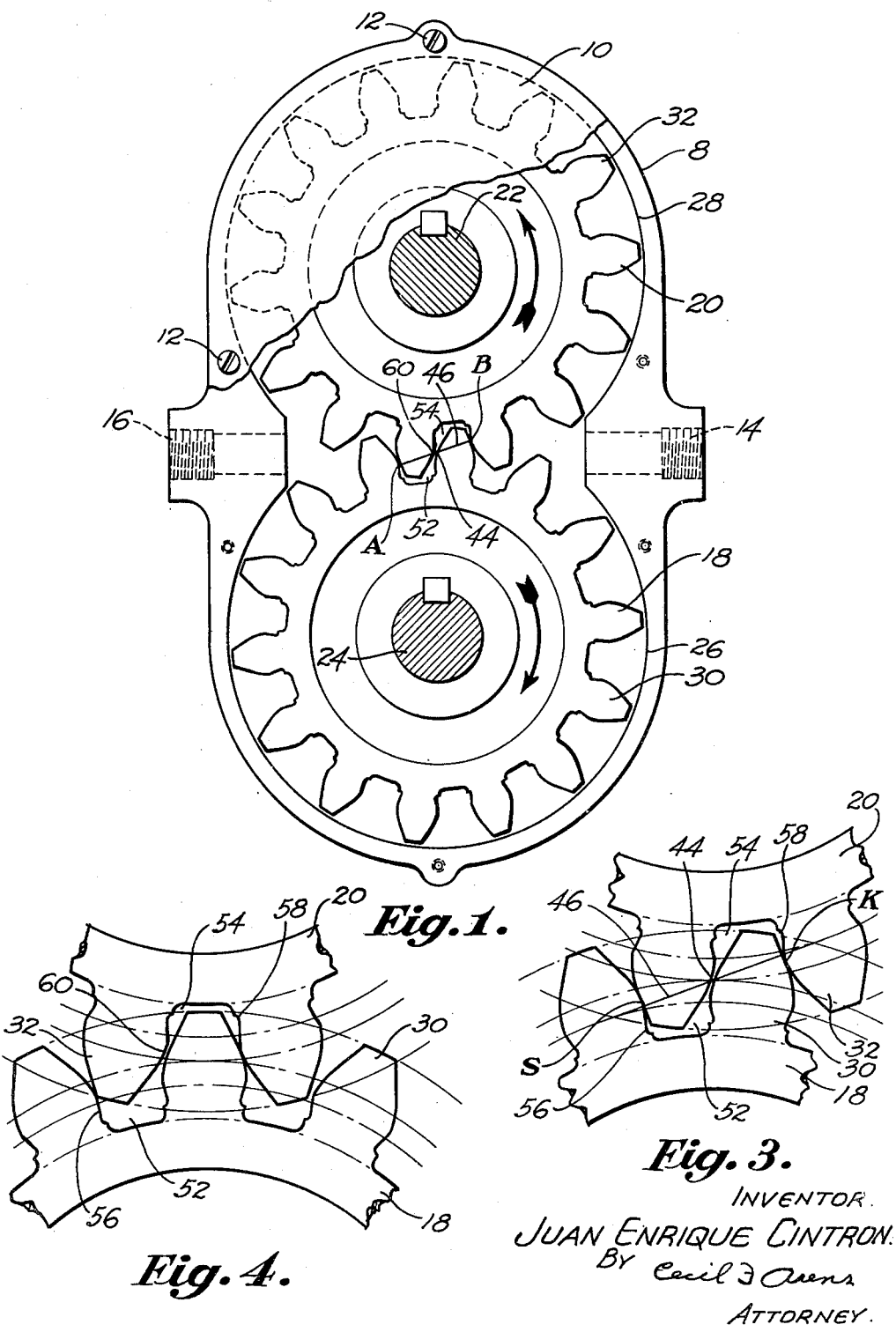
Figure 1 is a plan view, with the cover partly broken away, of one form of gear pump incorporating the invention.
Figure 3 is an enlarged view of parts of two gears in meshing relationship.
Figure 4 is a view of parts of the two gears of Figure 1, showing the relationship of the teeth at their initial stage of mesh.

Referring now to Figure 1 the reference numeral 8 designates a pump or motor housing having a cover 10 mounted thereon by screws 12. The body is provided with an inlet 14 and outlet 16. A driving gear 18 is rotatably disposed within the body in meshing relationship with a gear 20. The latter gear is keyed to a shaft 22 which is carried by the body. The driving gear 18 is keyed to a shaft 24 and constructed and arranged to rotate said gears. The interior of the pump or motor housing is formed at 26 and 28 to cooperate with the gears 18 and 20 for conveying fluid from the inlet 14 to the outlet 16 where the fluid is put under pressure. In the present illustration the driving gear 18 is considered to rotate in a clockwise direction as indicated by the arrow.

Figure 2:
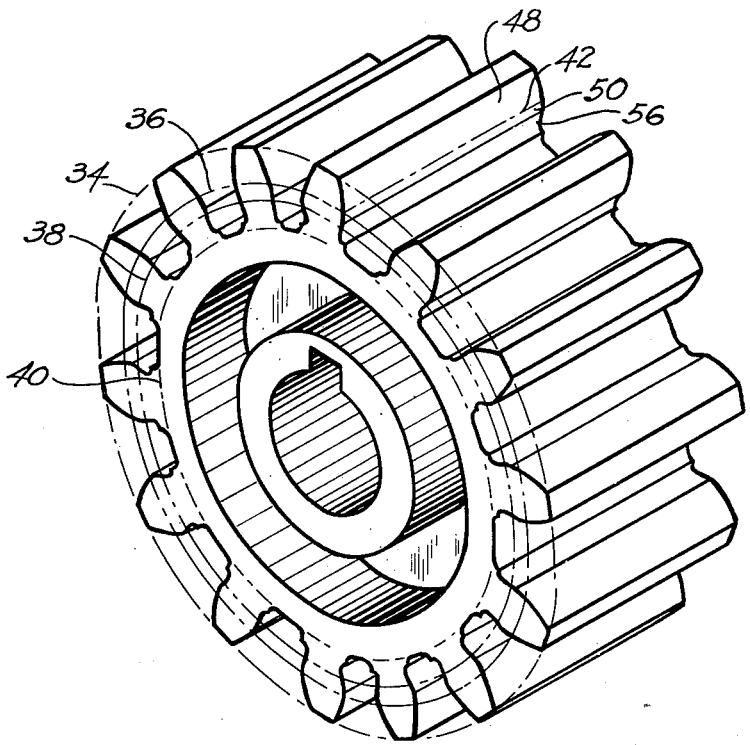
Figure 2 is an isometric view of one of the gears of the pump or motor.

The gears 18 and 20 are of the spur gear type having teeth 30 and 32. Referring now to Figures 1 and 2, these gears include an addendum circle 34, a pitch circuit 36, base circle 38, dedendum circle 40, pitch line 42, pitch point 44 and line of action 46. The tooth surfaces of the respective teeth are located between the addendum and dedendum circles and are divided by pitch lines 42 into tooth faces 48 and tooth flanks 50.

Fluid is received at the inlet by the gear teeth and carried to the outlet in a manner familiar to those skilled in the art. To prevent the entrapment of fluid in pockets 52 and 54 formed between meshing teeth 30 and 32 the leading flanks of the teeth 30 are relieved or grooved at 56, and the trailing flanks of teeth 32 are relieved at 58, as best shown in Figures 2, 3 and 4. Backlash designated at 60, formed between contiguous faces of the teeth of meshing gears provides communication between the pockets 52 and 54 which rotate as the gears rotate. Backlash may be obtained in any suitable manner familiar to those skilled in the art. In actual practice the grooves or reliefs are formed in both flanks of a gear tooth to permit operation of the device in either direction. See Figure 2.

It is obvious that if an escape of some kind is not provided for this confined fluid, as the gear teeth rotate into meshing relationship they would tend to compress the substantially noncompressible fluid, such as oil, which in all probabilities would result in pump destruction. At the time of initial contact between teeth 30 and 32 (see Figure 4) pocket 54 is of less volume than pocket 52. As the driving gear 18 rotates the driven gear 20 in a clockwise direction the pocket 54 increases in volume and pocket 52 decreases in volume but the rate of decrease in volume of the latter pocket is greater than the rate of increase in volume of the former pocket until a predetermined position of rotation of the teeth is reached. This difference in rate of increase over decrease in volume of the confined fluid is in a direction which tends to put the fluid under pressure.

If the grooves in the tooth flanks are not properly and accurately located malfunction of the pump is inevitable. For optimum pump operation it has been found that the reliefs 56 and 58 should not extend radially along the tooth flanks beyond the points A and B which are the points of intersection on the tooth flanks of the line of action at a time when two mating tooth surfaces have their pitch lines coextensive at the pitch point. The reliefs or grooves 56 and 58 extend laterally across the tooth flanks the entire tooth width. As hereinbefore pointed out the grooves should not extend in a radial direction beyond the point of intersection with the tooth flank of the line of action, but the groove width or its radial dimension should be sufficient to allow the unimpeded escape of fluid from the pockets during pump operation. To this end the reliefs extend radially along the tooth flanks to a predetermined distance in the direction of the dedendum circle. The groove width in general depends upon pump size and construction. Points A and B are located by the intersection of the line of action with the points of tangency between the driving and driven teeth of the gears 18 and 20 respectively. The actual location of the grooves is determined as follows: When two mating tooth surfaces have their pitch lines substantially coextensive at the pitch points, tooth flanks are grooved or otherwise exteriorly relieved from points in the tooth flanks adjacent the base circles to points where the line of action intersects the tooth flanks.

When the line of action 46 passes through points A and B as aforementioned pockets 52 and 54 are of substantially the same volume (see Figure 3). During initial contact between gear teeth 30 and 32, pocket 52 is greater in volume than pocket 54, as best shown in Figure 4. In Figures 1 and 3 the pockets 52 and 54 have just closed to outlet since surface contact at S between the two trailing tooth surfaces across the entire tooth width has been established to thereby close the passage or groove 56 to outlet. Also, groove 58 is closed to inlet at this time. The pockets 52 and 54 are of substantially the same volume. A slight amount of rotation of gear 18 will uncover the groove 58 to communicate the pockets with the inlet 14. Referring to Figure 3 it will be noted that the leading flank of tooth 30 of gear 18 was in driving engagement at K with the trailing flank of tooth 32 of gear 20 during the time that the pockets were in communication with the outlet port. However, substantially simultaneously with closing of passage 56 to outlet and the establishment of surface contact at S between the tooth surfaces of the trailing teeth, passage 58 opens to inlet and driving engagement at K between the tooth surfaces of the leading teeth ceases. Continued rotation of the driving gear, beyond where the line of action passes through the points A and B will cause pocket 52 to decrease in volume but at a rate slower than the increase in volume of pocket 54 to thereby tend to create a low pressure or vacuum in the pockets. However, this condition is avoided by providing the passage 58 which communicates pocket 54 with the inlet 14 substantially simultaneously with the closing of the pocket 52 from the outlet, as aforementioned, as best shown in Figures 1 and 3. It should be pointed out that if the grooves extend too far radially over the two flanks there will be leakage from the outlet to the inlet whereby the volumetric efficiency of the pump will be reduced and if the grooves are too short high pressures will be developed within the pockets between the gears.

Although the invention has been described in connection with certain specific embodiments the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid pump or motor, a body having an inlet and an outlet, driving and driven gears disposed within the body with backlash therebetween, said gears having teeth with surfaces in contact when the gears are in meshing relationship so that pockets are formed between the teeth in mesh in which fluid is entrapped, and a channel in the flanks of the leading tooth surfaces of each of the teeth of the driving gear and in the flanks of the trailing tooth surfaces of each of the teeth of the driven gear, said channel extending laterally the width of a tooth and radially from a predetermined point in the tooth flank below the base circle of the gear to a point where the line of action intersects the tooth flanks of the teeth of the two gears when two mating tooth surfaces have their pitch lines substantially coextensive at the pitch point.

2. In a fluid pump or motor, a body having an inlet and an outlet, a pair of gears located in the body in meshing relationship with backlash therebetween, the teeth in mesh forming moving pockets therebetween in which fluid is entrapped, and means providing an escape for the entrapped fluid comprising a slot or channel in the leading tooth flanks of the teeth of one of said gears and in the trailing tooth flanks of the teeth of the other gear, said slot extending laterally the entire width of a tooth and radially from a predetermined line in the tooth flank below the base circle to a line in the tooth flank which intersects the line of action when two mating tooth surfaces have their pitch lines substantially coextensive at the pitch point.

3. A fluid pump or motor comprising a body having an inlet and an outlet, a pair of gears located in the body in meshing relationship with backlash therebetween, the teeth in mesh forming moving pockets therebetween having variable volumes which entrap fluid, the increase in volume of one of the pockets being at a slower rate than the decrease in volume of the other pocket, whereby the entrapped fluid in said one pocket tends to be subjected to a decreasing pressure and the entrapped fluid in said other pocket tends to be subjected to an increasing pressure, and means providing an escape for the entrapped fluid from the pockets comprising a channel in the leading tooth flanks of each of the teeth of one of the gears and in the trailing tooth flanks of each of the teeth of the other gear, said channel extending laterally the entire tooth width and radially from a predetermined point in the tooth flank adjacent the base circle of the gear to a point where the line of action intersects the tooth flanks when two mating tooth surfaces have their pitch lines substantially coextensive at the pitch point.

4. In a fluid pump or motor, a body having an inlet and an outlet, driving and driven gears disposed within the body in meshing relationship, the teeth in mesh forming pockets therebetween in which fluid is entrapped, said gears having backlash therebetween, and a relief in the flanks of the leading tooth surfaces of each of the teeth of one of the gears and in the flanks of the trailing tooth surfaces of each of the teeth of the other gear, said relief extending laterally across the tooth width and radially from a predetermined point in the tooth flank below the base circle of the gear to a point where the line of action intersects the leading flank of the teeth of said one gear and the trailing flank of the teeth of said other gear, when two mating tooth surfaces have their pitch lines substantially coextensive at the pitch point.

JUAN E. CONTRÓN.

REFERENCES CITED

The following references are of record in the file of this patent:

UNITED STATES PATENTS

| Number | Name | Date |
|---|---|---|
| 1,252,160 | Pagel | Jan. 1, 1918 |
| 1,633,793 | Porst | June 28, 1927 |
| 1,686,867 | Kuhn | Oct. 9, 1928 |
| 1,728,529 | Butler | Sept. 17, 1929 |
| 1,923,268 | Jensen | Aug. 22, 1933 |
| 1,976,227 | Howard | Oct. 9, 1934 |
| 2,159,744 | Maglott | May 23, 1939 |
| 2,344,628 | Monahan | Mar. 21, 1944 |

FOREIGN PATENTS

| Number | Country | Date |
|---|---|---|
| 439,908 | Great Britain | Dec. 17, 1935 |